UNITED STATES PATENT OFFICE.

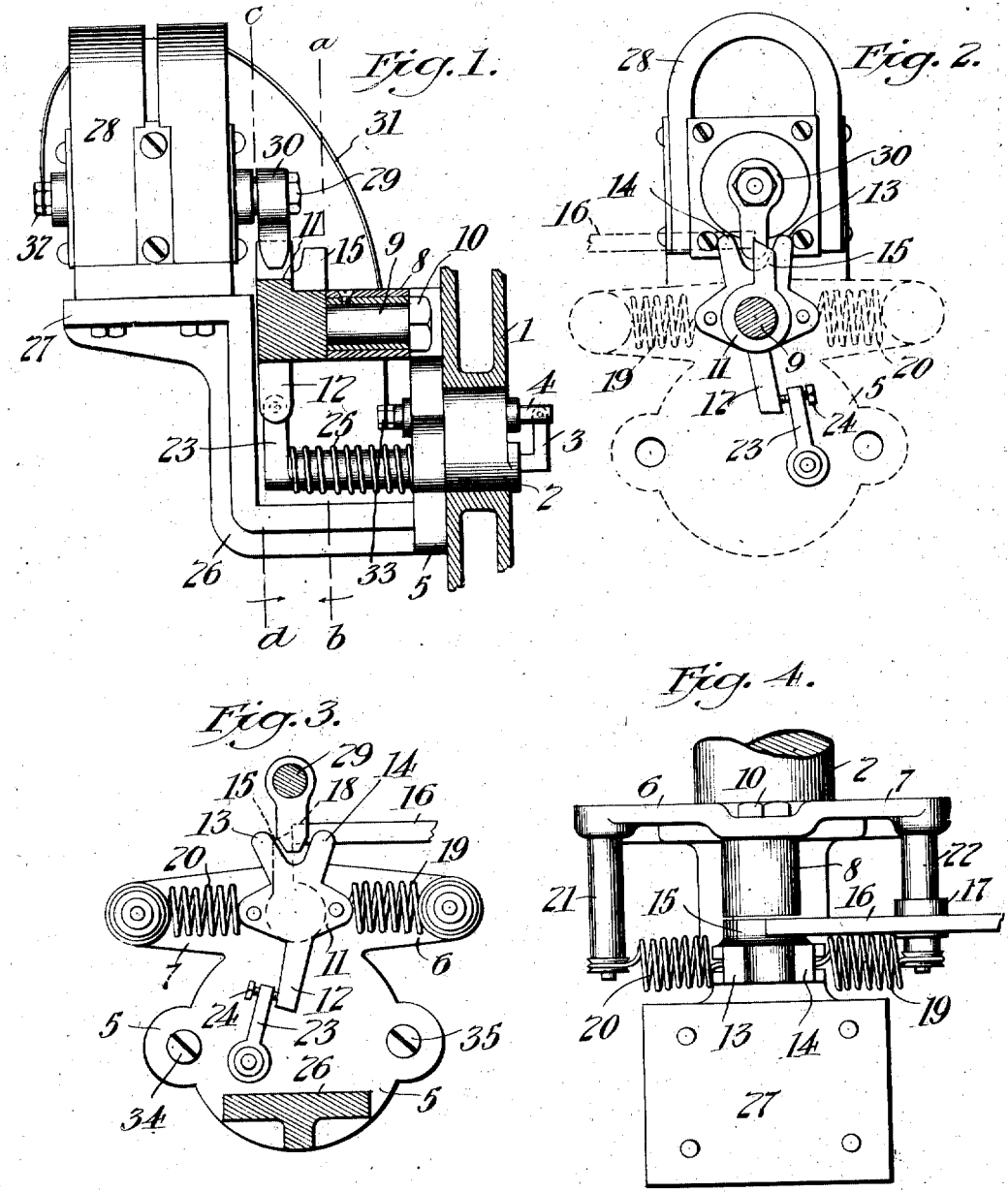

HARRY RANDOLPH VAN DEVENTER, OF SUMTER, SOUTH CAROLINA, ASSIGNOR, BY MESNE ASSIGNMENTS, TO SPLITDORF ELECTRICAL COMPANY, OF NEWARK, NEW JERSEY, A CORPORATION OF NEW JERSEY.

IGNITING MECHANISM FOR INTERNAL-COMBUSTION ENGINES.

1,236,790.  Specification of Letters Patent.  Patented Aug. 14, 1917.

Application filed October 1, 1914. Serial No. 864,447.

*To all whom it may concern:*

Be it known that I, HARRY RANDOLPH VAN DEVENTER, a citizen of the United States, residing at Sumter, in the county of Sumter and State of South Carolina, have invented certain new and useful Improvements in Igniting Mechanism for Internal-Combustion Engines, of which the following is a specification, reference being had to the accompanying drawing.

This invention relates to igniters of the make-and-break type, and has for its purpose the provision of an igniter bracket upon which magneto may be mounted, the magneto armature or rotor being oscillated by means of suitable mechanism carried upon the igniter bracket.

A further object is to provide a bracket adapted to be mounted on an engine, and carrying the engine igniter and the magneto, and all of the operating means therefor, the operating means being so disposed in regard to the engine push rod or other actuating device, that the magneto may be removed without interfering in any way with the operation of the igniter proper, thus permitting battery to be connected to the igniter in the event of any trouble with the magneto.

Another object is to provide a combined igniter and magneto mounting having a flange adapted to be secured to the engine cylinder by suitable means, and carrying on this flange suitable spring means for oscillating both the magneto and the igniter.

Figure 1 is a side view, partly sectional, of my invention. Fig. 2 is a view of same looking toward the end of the magneto on the line *a, b*, Fig. 1, and showing diagrammatically the arrangement of the various parts. Fig. 3 is a diagram looking toward the igniter on the line *c, d*, Fig. 1 and showing the shape of the igniter flange casting. Fig. 4, a view looking down on the mechanism with the magneto removed. Like figures of reference denote the same parts wherever they are shown.

1 denotes the wall of the engine cylinder. Fitted into this in the usual manner such as the bolts 34, 35 is the igniter body 2 carrying the movable contact 3 and fixed contact 4 constituting the usual make-and-break igniter mechanism. A flange 5 projects around the aperture in the cylinder, and projecting from this flange and preferably integral therewith are the arms 6 and 7, and the boss 8, the latter forming a bearing for the shaft 9 which is secured in the bearing in any suitable manner, such as the screw 10. On the outer end of shaft 9 is fastened the trip lever 11, which is provided with a projecting igniter trip finger 12, and two upwardly projecting magneto fingers 13 and 14. There is also an engine trip 15, adapted to be engaged by the push rod 16, the outer end of said rod being suitably connected to some moving part of the engine so that the rod has a reciprocating motion over the small pulley 17, which causes the inner end of the rod 18 to push inwardly against 15 until 15 rides under it. Such a trip motion is now commonly used in connection with make-and-break igniters.

Attached to the trip lever 11 are suitable springs 19 and 20 which cause the trip lever to occupy normally the position shown in the drawings. These springs are supported on suitable studs 21 and 22 on the ends of the arms 6 and 7.

The movable contact 3 of the igniter extends outwardly through the flange 5, and carries at its outer end an arm 23 having suitable adjusting means such as screw 24, whereby the relative positions of 23 and the igniter trip finger 12 may be adjusted. This is occasioned by the necessity, when some magnetos are used, of having the igniter contacts closed; while again, when battery is used, it is preferable to have igniter contacts normally open.

A spring or any other suitable means 25 may be employed to hold the contacts of the igniter together, or arm 23 in contact with igniter trip finger 12, which would leave the contacts normally open.

Projecting from the flange 5 and preferably integral therewith, is a bracket arm 26 forming at its upper end the support 27, upon which may be mounted any suitable magneto 28. The shaft 29 of the magneto carries a dog 30 the lower end of which is positioned between magneto fingers 13 and 14 of the trip lever. A suitable connection 31 is made between the circuit terminal 32 of the magneto, and the binding post 33 on the outer end of the fixed contact 4 of the igniter, this fixed contact being suitably insulated from the frame or body 2.

Presuming the magneto to be of the alternating current type the armature or rotor of same is so set in relation with the dog 30 that when the dog is moved to the left, Fig. 3, and suddenly released, that the peak of the current wave produced by the movement of the armature will occur at the same time the igniter points in the cylinder separate. This is accomplished by the push rod 16 engaging the trip 15 thereby pushing the trip lever to one side which causes 15 to slip off the end 18 of 16. When this occurs springs 19 and 20 cause a quick return of the trip lever to its normal or central position, and the fingers 13 and 14 cause a corresponding rapid movement of the dog 30 thereby actuating the magneto. At the same time the igniter trip finger 12 strikes arm 23 causing the separation of the igniter contacts in the cylinder thereby producing a spark.

If for any reason it is desired to remove the magneto, it may be unbolted from the support 27 and the connection 31 removed from the binding post 33. Any other suitable current source may now be connected to 33 and the engine operated without the magneto, as the parts that operate the igniter have not been disturbed.

I am aware that it is old to use an oscillating magneto mounted on a bracket integral with the igniter flange 5, but in all such arrangements the springs 19 and 20 and the trip lever 11 are mounted on the magneto and form part of same. This being the case it is obvious that the removal of the magneto from the bracket removes the means by which the igniter arm 23 or its equivalent is operated, and therefore the engine cannot be used until the magneto is replaced. This is very inconvenient in cases of magneto trouble, and makes it necessary on engines having this type of combined igniter and magneto, to provide a separate igniter mechanism, so that when it is necessary to use some other source of ignition than the magneto, this special igniter mechanism may be put on the engine. In such igniters the arm 23 or its equivalent is operated directly by the push rod 16.

My invention therefore consists broadly of mounting the trip lever and springs on the igniter casting which renders a special igniter unnecessary in case the magneto is removed; and while I have shown a single casting comprising the igniter body, the arms for supporting the springs and trip lever, and a support for the magneto, I desire to have it understood that the arrangement shown is merely illustrative, as these parts may consist of different pieces suitably fastened together. Other changes may be made as are within the scope of the appended claims.

Having thus described my invention, I claim:

1. In an ignition device, an igniter body having a flanged portion adapted to be secured to an engine cylinder, a projection on said body, a trip lever, a support for said trip lever mounted on said projection, a fixed and a movable electrode carried on the igniter body in position to enter the combustion chamber of the engine cylinder when in place, actuating means for said movable electrode extending through the igniter body into operative relation with the trip lever, a part of said trip lever adapted to be engaged and moved by a moving part of the engine, and spring means for returning the trip lever and operating the said movable electrode after initial actuation by the engine part, all in combination with a magneto removably supported by said projection and detachable connecting means between the rotor of said magneto and said trip lever.

2. The combination of an igniter having relatively fixed and movable electrodes, an arm on the movable electrode, a generator having a rotor, an arm connected therewith, a trip lever between said arms, spring means carried on the flange of said igniter tending to normally hold the rotor in a given position, spring means of less tension than the first mentioned means and operating on the first mentioned arm to hold the same in engagement with the trip lever, and means for actuating the trip lever.

3. The combination of an igniter having relatively fixed and movable electrodes, an arm on the movable electrode, a spring connected with the arm, a generator having a rotor, an arm on the rotor, a trip lever operable independently of said generator, a push rod for operating said trip lever, and springs holding said trip lever in a predetermined position, whereby said generator with its operating arm may be removed from the action of said trip lever without affecting the action of same in relation to said movable electrode, substantially as described.

4. An ignition device comprising a casting supporting a suitable generator, a make-and-break igniter and spring controlled means for operating said generator and igniter, and a loose coupling between said spring controlled means and said generator whereby the generator may be removed or replaced in relation to said operating means without affecting the operation of the latter, substantially as described.

5. An ignition device comprising a body portion carrying igniter mechanism, a flange on said body whereby same may be supported on an engine, means projecting from said flange for operating said igniter mechanism, a trip lever supported by said flange, anchor posts carried by the flange and positioned at opposite sides of the trip lever, tension means between said posts and trip lever, and means between said trip lever and igniter mechanism whereby said mechanism may be operated by said tension means.

6. An ignition device comprising a body portion carrying igniter mechanism, a flange on said body whereby same may be supported on an engine, means projecting from said flange for operating said igniter mechanism, a trip lever, anchor posts carried by the flange and positioned at opposite sides of the trip lever, tension means between said post and trip lever, a generator, and means between said generator, igniter operating means, and trip lever whereby said generator and igniter mechanism may be operated by the action of said tension means.

7. An ignition device for internal combustion engines comprising an igniter body carrying a mechanically operated igniter contact adapted to be mounted on an engine with the igniter contact projecting into the combustion chamber thereof, a trip lever mounted on the igniter body in operative relation to the said mechanically operated igniter, and a retractile spring connection between said trip lever and said igniter body, together with means for removably supporting a magneto in operative relation to the trip lever comprising a bracket carried by the igniter body, and means for transmitting motion from the trip lever to the magneto.

8. An ignition device for internal combustion engines comprising an igniter body carrying a mechanically operated igniter contact and adapted to be mounted on an engine cylinder with the igniter contact within the combustion chamber thereof, a magneto, a trip lever, tension means connecting said trip lever with the igniter body independent of the magneto, and means for transmitting motion from the trip lever to each of said igniter contact and said magneto.

9. An ignition device for internal combustion engines comprising an igniter body carrying a movable igniter contact and adapted to be mounted on an engine cylinder with the igniter contact projecting into the combustion chamber thereof, a trip lever and retractile means therefor mounted on the igniter body in operative connection with said movable igniter contact, a bracket carried by the igniter body for removably supporting a magneto, and loose coupling means for operatively connecting said trip lever with a magneto when supported on said bracket.

10. An ignition device for internal combustion engines comprising an igniter body carrying a movable igniter contact and adapted to be mounted on an engine with the igniter contact projecting into the combustion chamber of the engine, a bracket carried by the igniter body, a magneto removably mounted on said bracket, a trip lever and retractile means therefor mounted on the igniter body and operable independently of said magneto, means for transmitting motion from said trip lever to the movable igniter contact, and a loose coupling between said magneto and the trip lever carried partly by the magneto and partly by the trip lever.

11. An ignition device for internal combustion engines comprising an igniter body adapted to be mounted on an engine, a bearing in said igniter body carrying a movable igniter contact so positioned as to project into the ignition chamber of an engine when the said body is mounted thereon, another bearing on said igniter body carrying a trip lever, a magneto mounted on the igniter body, an operating shaft for said magneto mounted in bearings distinct from said first mentioned bearings, and means for transmitting motion from said trip lever to each of said igniter contact and said operating shaft.

12. An ignition device for internal combustion engines comprising an igniter body carrying a movable electrode and adapted to be mounted on an engine with the igniter contact projecting into the combustion chamber thereof, a trip lever, a magneto and an operating shaft therefor, separate and independent bearings for the movable electrode, the trip lever, and the magneto shaft, and means for transmitting motion from said trip lever both ways to the movable electrode and the magneto shaft.

13. A device of the class described, comprising a bracket adapted to be secured to an internal combustion engine, an oscillatory member mounted on the bracket, means driven by the engine for operating said member, an igniter carried by the bracket and disposed within the combustion chamber of the engine, a magneto consisting of a rotor and a field magnet, the rotor being operatively connected with said member, and devices for removably supporting the magneto to the bracket, said igniter being controlled by the oscillatory member whereby the igniter may be operated without the magneto.

14. A device of the class described, comprising a bracket adapted to be secured to an internal combustion engine, an oscillatory member mounted on the bracket, means driven by the engine for operating said member, an igniter carried by the bracket and disposed within the combustion chamber of the engine, a magneto consisting of a rotor and a field magnet, the rotor being detachably connected with said member, and devices for removably supporting the magneto from the bracket, said igniter being controlled by the oscillatory member whereby the igniter may be operated without the magneto.

15. A device of the class described, comprising a bracket adapted to be secured to an internal combustion engine, an oscillatory member mounted on the bracket, means driven by the engine for operating said member, an igniter carried by the bracket and disposed within the combustion chamber of the engine, a magneto consisting of a rotor and field magnet, the rotor being operatively connected with said member, and devices for removably supporting the field magnet of the magneto from the bracket, said igniter being controlled by the oscillatory member whereby the igniter may be operated without the magneto.

16. A device of the class described, comprising a bracket adapted to be secured to an internal combustion engine, an oscillatory member mounted on the bracket, means driven by the engine for operating said member, a make and break igniter carried by the bracket and disposed within the combustion chamber of the engine, a magneto consisting of a rotor and a field magnet, the rotor being operatively connected with said member, and devices for removably supporting the magneto from the bracket, said igniter being controlled by the oscillatory member whereby the igniter may be operated without the magneto.

17. A device of the class described, comprising a bracket adapted to be secured to an internal combustion engine, an oscillatory member mounted on the bracket, means driven by the engine for operating said member, a make and break igniter carried by the bracket and disposed within the combustion chamber of the engine, a magneto consisting of a rotor and a field magnet, the rotor being operatively connected with said member, and devices for removably supporting the field magnet of the magneto from the bracket, said igniter being controlled by the oscillatory member whereby the igniter may be operated without the magneto.

18. A device of the class described, comprising a bracket adapted to be secured to an internal combustion engine, an oscillatory member mounted on the bracket, means driven by the engine for operating said member, a make and break igniter carried by the bracket and disposed within the combustion chamber of the engine, a magneto consisting of a rotor and a field magnet, the rotor being detachably connected with said member, and devices for removably supporting the magneto from the bracket, said igniter being controlled by the oscillatory member whereby the igniter may be operated without the magneto.

19. A device of the class described, comprising a bracket adapted to be secured to an internal combustion engine, an oscillatory member mounted on the bracket, means driven by the engine for operating said member, a make and break igniter carried by the bracket and disposed within the combustion chamber of the engine, a magneto consisting of a rotor and a field magnet, the rotor being detachably connected with said member, and devices for removably supporting the field magnet of the magneto from the bracket, said igniter being controlled by the oscillatory member whereby the igniter may be operated without the magneto.

20. A device of the class described, comprising a bracket adapted to be secured to an internal combustion engine, an oscillatory member mounted on the bracket, means driven by the engine for operating said member, an igniter carried by the bracket and disposed within the combustion chamber of the engine, spring means carried by the bracket tending to hold the oscillatory member in a given position, a magneto consisting of a rotor and a field magnet, the rotor being operatively connected with said member, and devices for removably supporting the magneto from the bracket, said igniter being controlled by the oscillatory member whereby the igniter may be operated without the magneto.

21. A device of the class described, comprising a bracket adapted to be secured to an internal combustion engine, an oscillatory member mounted on the bracket, means driven by the engine for operating said member, an igniter carried by the bracket and disposed within the combustion chamber of the engine, spring means carried by the bracket tending to hold the oscillatory member in a given position, a magneto consisting of a rotor and a field magnet, the rotor being operatively connected with said member, and devices for removably supporting the field magnet of the magneto from the bracket, said igniter being controlled by the oscillatory member, whereby the igniter may be operated without the magneto.

22. A device of the class described, comprising a bracket adapted to be secured to an internal combustion engine, an oscillatory member mounted on the bracket, means driven by the engine for operating said member, a make and break igniter carried by the bracket and disposed within the combustion chamber of the engine, spring means carried by the bracket tending to hold the oscillatory member in a given position, a magneto consisting of a rotor and field magnet, the rotor being operatively connected with said member, and devices for removably supporting the magneto from the bracket said igniter being controlled by the oscillatory member, whereby the igniter may be operated without the magneto.

23. A device of the class described, comprising a bracket adapted to be secured to an internal combustion engine, an oscillatory member mounted on the bracket, means driven by the engine for operating said member, a make and break igniter carried by the bracket and disposed within the combustion chamber of the engine, spring means carried by the bracket tending to hold the oscillatory member in a given position, a magneto consisting of a rotor and a field magnet, the rotor being operatively connected with said member, and devices for removably supporting the field magnet of the magneto from the bracket, said igniter being controlled by the oscillatory member, whereby the igniter may be operated without the magneto.

24. A device of the class described, comprising a bracket adapted to be secured to an internal combustion engine, an oscillatory member mounted on the bracket, means driven by the engine for operating said member, an igniter carried by the bracket and disposed within the combustion chamber of the engine, spring means carried by the bracket tending to hold the oscillatory member in a given position, a magneto consisting of a rotor and a field magnet, the rotor being detachably connected with said member, and devices for removably supporting the magneto from the bracket, said igniter being controlled by the oscillatory member, whereby the igniter may be operated without the magneto.

25. A device of the class described, comprising a bracket adapted to be secured to an internal combustion engine, an oscillatory member mounted on the bracket, means driven by the engine for operating said member, a make and break igniter carried by the bracket and disposed within the combustion chamber of the engine, spring means carried by the bracket tending to hold the oscillatory member in a given position, a magneto consisting of a rotor and a field magnet, the rotor being detachably connected with said member, and devices for removably supporting the field magnet of the magneto from the bracket, said igniter being controlled by the oscillatory member, whereby the igniter may be operated without the magneto.

26. A device of the class described, comprising a bracket adapted to be secured to an internal combustion engine, an oscillatory member mounted on the bracket, means driven by the engine for operating said member, a make and break igniter carried by the bracket and disposed within the combustion chamber of the engine, spring means carried by the bracket tending to hold the oscillatory member in a given position, a magneto consisting of a rotor and a field magnet, the rotor being detachably connected with said member, and devices for removably supporting the magneto from the bracket, said igniter being controlled by the oscillatory member, whereby the igniter may be operated without the magneto.

27. A device of the class described, comprising a bracket adapted to be secured to an internal combustion engine, an operating shaft journaled in the bracket, means driven by the engine for operating the shaft, an igniter carried by the bracket and disposed within the combustion chamber of the engine, a magneto consisting of a rotor and a field magnet, the rotor being operatively connected with said shaft, and devices for removably supporting the magneto from the bracket, said igniter being actuated by said shaft, whereby the igniter may be operated without the magneto.

28. A device of the class described, comprising a bracket adapted to be secured to an internal combustion engine, an operating shaft journaled in the bracket, means driven by the engine for operating the shaft, an igniter, carried by the bracket and disposed within the combustion chamber of the engine, a magneto consisting of a rotor and a field magnet, the rotor being operatively connected with said shaft, and devices for removably supporting the field magnet of the magneto from the bracket, said igniter being actuated by said shaft, whereby the igniter may be operated without the magneto.

29. A device of the class described, comprising a bracket adapted to be secured to an internal combustion engine, an operating shaft journaled in the bracket, means driven by the engine for operating the shaft, a make and break igniter carried by the bracket and disposed within the combustion chamber of the engine, a magneto consisting of a rotor and field magnet, the rotor being operatively connected with said shaft, and devices for removably supporting the magnet from the bracket, said igniter being actuated by said shaft, whereby the igniter may be operated without the magneto.

30. A device of the class described, comprising a bracket adapted to be secured to an internal combustion engine, an operating shaft journaled in the bracket, means driven by the engine for operating the shaft, a make and break igniter carried by the bracket and disposed within the combustion chamber of the engine, a magneto consisting of a rotor and a field magnet, the rotor being operatively connected with said shaft, and devices for removably supporting the field magnet of the magneto from the bracket, said igniter being actuated by said shaft, whereby the igniter may be operated without the magneto.

31. A device of the class described, comprising a bracket adapted to be secured to an internal combustion engine, an operating shaft journaled in the bracket, means driven by the engine for operating the shaft, an igniter carried by the bracket and disposed within the combustion chamber of the engine, spring means carried by the bracket tending to hold the shaft in a given position, a magneto consisting of a rotor and a field magnet, the rotor being operatively connected with said shaft, and devices for removably supporting the magneto from the bracket, said igniter being actuated by said shaft, whereby the igniter may be operated without the magneto.

32. A device of the class described, comprising a bracket adapted to be secured to an internal combustion engine, an operating shaft journaled in the bracket, means driven by the engine for operating the shaft, an igniter carried by the bracket and disposed within the combustion chamber of the engine, spring means carried by the bracket tending to hold the shaft in a given position, a magneto consisting of a rotor and a field magnet, the rotor being operatively connected with said shaft, and devices for removably supporting the field magnet of the magneto from the bracket, said igniter being actuated by said shaft, whereby the igniter may be operated without the magneto.

33. A device of the class described, comprising a bracket adapted to be secured to an internal combustion engine, an operating shaft journaled in the bracket, means driven by the engine for operating the shaft, a make and break igniter carried by the bracket and disposed within the combustion chamber of the engine, spring means carried by the bracket tending to hold the shaft in a given position, a magneto consisting of a rotor and a field magnet, the rotor being operatively connected with said shaft, and devices for removably supporting the magneto from the bracket, said igniter being actuated by said shaft, whereby the igniter may be operated without the magneto.

34. A device of the class described, comprising a bracket adapted to be secured to an internal combustion engine, an operating shaft journaled in the bracket, means driven by the engine for operating the shaft, a make and break igniter carried by the bracket and disposed within the combustion chamber of the engine, spring means carried by the bracket tending to hold the shaft in a given position, a magneto consisting of a rotor and a field magnet, the rotor being operatively connected with said shaft, and devices for removably supporting the field magnet of the magneto from the bracket, said igniter being actuated by said shaft, whereby the igniter may be operated without the magneto.

35. In an ignition device, an igniter with fixed and movable electrodes, a bracket, a magneto supported on said bracket, operating means for said magneto adapted to be actuated intermittently by a moving part of an engine to which the igniter is attached, a pair of horns or posts secured to the said bracket, and spring means extending from said horns or posts normally tending to maintain the movable member of the magneto in a fixed and determinate position and to return the same thereto when actuated by said movable engine part.

36. In an ignition device, an igniter with fixed and movable electrodes, a bracket, a magneto detachably supported on said bracket, operating means for said magneto adapted to be actuated intermittently by a moving part of an engine to which the igniter is attached, a pair of horns or posts secured to the said bracket, and spring means extending from said horns or posts normally tending to maintain the movable member of the magneto in a fixed and determinate position and to return the same thereto when actuated by said movable engine part.

37. In ignition apparatus, an igniter body carrying fixed and movable electrodes, a bracket secured to said body, a magneto generator detachably supported on the bracket, and operating means for the movable electrode of the igniter adapted to be actuated by a moving part of the engine, and to be alternatively connected so as to operate the movable electrode and magneto simultaneously for magneto ignition, or the movable electrode without the magneto, for battery ignition.

38. In combination, a bracket adapted to be secured to an engine cylinder, a movable electrode journaled in said bracket and adapted to project within the engine cylinder, a magneto removably supported by said bracket, spring actuated means for oscillating the electrode and the rotor of the magneto, said means being arranged to maintain operative relation with the electrode, when the magneto is removed.

In testimony whereof I hereunto affix my signature in the presence of two witnesses.

HARRY RANDOLPH VAN DEVENTER.

Witnesses:
 EDNA ISLER,
 E. H. RHAME.